Sept. 3, 1968  S. H. SCHWARTZ  3,399,697

SOLENOID VALVE

Filed July 6, 1965  2 Sheets-Sheet 1

INVENTOR.
SAMUEL H. SCHWARTZ

BY
ATTORNEYS

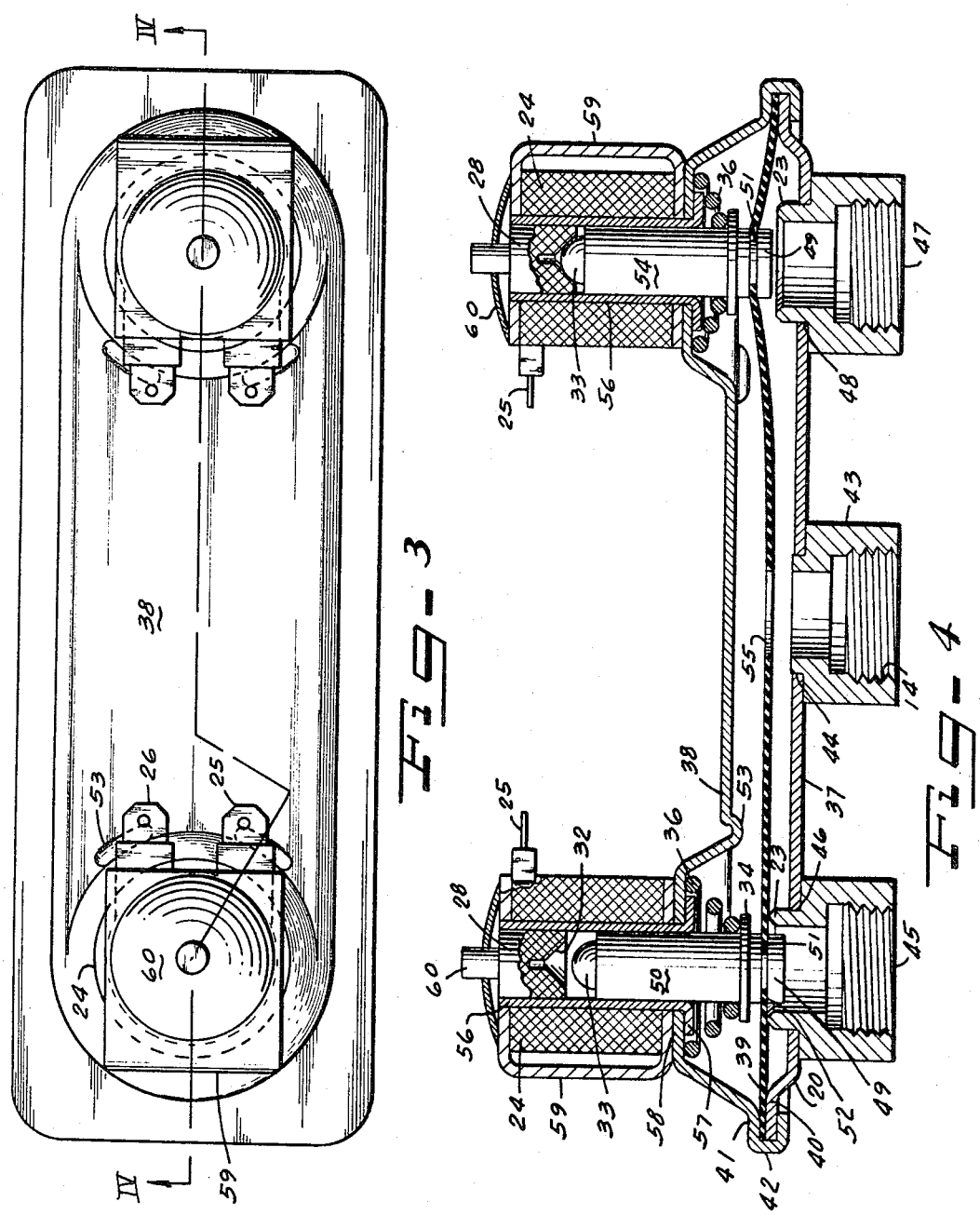

3,399,697
SOLENOID VALVE
Samuel H. Schwartz, Deerfield, Ill., assignor to The Dole Valve Company, Morton Grove, Ill., a corporation of Illinois
Filed July 6, 1965, Ser. No. 469,714
2 Claims. (Cl. 137—612.1)

ABSTRACT OF THE DISCLOSURE

A valve assembly having a valve body with an inlet and an outlet and having a resilient diaphragm disposed to be substantially taut across the interior of the valve and having a solenoid actuated valve head wherein the valve head includes a portion of the resilient diaphragm and the armature of the solenoid assembly. The armature is securely attached to the diaphragm and fits loosely within the outlet valve seat to carry the diaphragm into and out of engagement with the seat thereby opening and closing the outlet.

---

This invention relates to a valve assembly for gas service and in particular to a solenoid operated valve having a novel diaphragm and associated structure.

Solenoid operated valves are usually spring biased such that energization of the solenoid coil causes the armature to oscillate resulting in undesirable metallic noises. Such noises are particularly unwarranted in household appliances.

In addition to the need for minimizing oscillation noises, it is understood that it would be highly desirable to provide a single valve member which would function both as a gasket for the valve housing and as a valve seal for closing an outlet. Furthermore, it would be even more desirable if the same valve member could be utilized independently to operate several valve outlets in addition to furnishing the gasket requirement.

Therefore, it is an object of this invention to provide a solenoid valve assembly having a novel diaphragm attachment for damping armature oscillations.

It is also an object of this invention to provide a solenoid valve assembly which utilizes a single valve member both as a housing gasket and as an outlet seal.

It is a further object of this invention to provide a solenoid valve having a single diaphragm which is utilized for independently opening and closing a plurality of valve outlets.

These and other objects, features and advantages of the present invention will be understood in greater detail from the following description and the associated drawings wherein reference numerals are utilized in designating a preferred embodiment and wherein:

FIGURE 3 is a top view of a solenoid actuated valve assembly having two outlets; and FIGURE 4 is a sectional view of the valve assembly shown in FIGURE 3 taken along the lines IV—IV.

Figure 2:
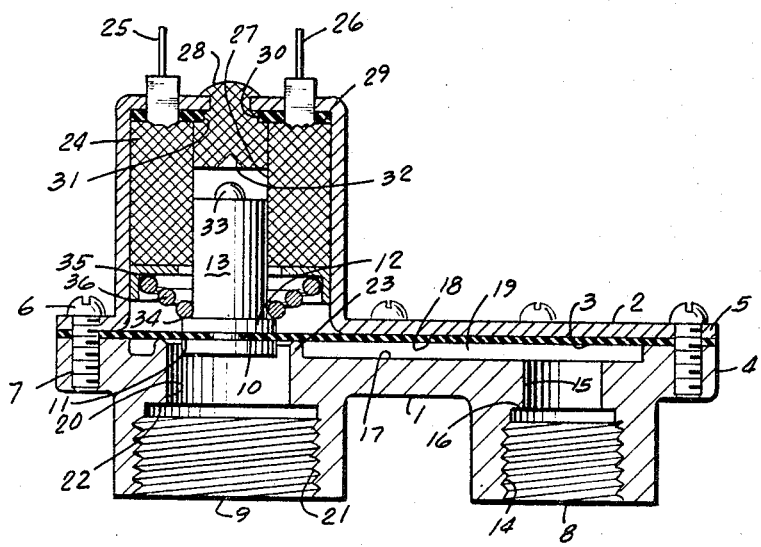
FIGURE 2 is a longitudinal sectional view of the valve assembly shown in FIGURE 1.

A preferred embodiment of this invention is shown in FIGURE 2 as having an upper and a lower housing pressure secured by a single resilient diaphragm which is also employed as a valve head for controlling the gas flow from an inlet to an outlet. The diaphragm is actuated in conjunction with an outlet by a solenoid operated armature. The armature is spring biased for closing the outlet, and due to the configuration of the upper housing and the diaphragm attachment, any oscillations that might be otherwise expected from the solenoid movement will be significantly damped.

In FIGURE 2, the lower housing 1 is shown in sealed engagement with the upper housing 2 through the provision for a resilient diaphragm 3 which is disposed between peripheral flanges 4 and 5. The two housings are assembled by a plurality of bevel head screws 6 disposed as in FIGURE 1 for being received within internally threaded bores 7 of the flange 4.

As mentioned above, the diaphragm 3 not only functions as a gasket between the lower and upper flanges 4 and 5 but also acts as a valve head for controlling the gas flow between an inlet 8 and an outlet 9. This is accomplished by securing the diaphragm directly to the armature associated with the valve solenoid. Here, the diaphragm attachment is achieved through the provision for an armature opening 10 which is snap fitted about a circumferential groove 11 formed within the head 12 of the armature 13.

Referring again to the inlet 8, it can be seen that an internally threaded surface 14 narrows to form a flow port 15 for providing, as a consequence thereof, a ridge 16. From the port 15 the upper surface 17 of the lower housing 1 is spaced from the lower surface 18 of the upper housing 2 for forming a flat chamber 19.

With the diaphragm 3 in an opened position, the chamber 19 will provide a direct passageway to the outlet 9 through a second flow port 20 formed inwardly of the threaded surface 21. The change in diameter from the port 20 to the outlet 9 results in a ridge 22 similar to that formed at the inlet 8.

To cooperate with the diaphragm 3 for closing the outlet 9, a valve seat 23 is formed as an extension of the flow port 20 and is in the nature of a collar protruding from the upper surface 17 of the lower housing 1.

In addition to supporting the diaphragm 3 the upper housing 2 is also the casing for the solenoid assembly, the fundamental element of which is a winding 24 which has first and second terminals connected directly to vertical prongs 25 and 26. The center of the winding 27 acts as a guide for the armature 13 and has a plug 28 disposed at the upper portion thereof for closing the interior of the valve assembly. The plug 28 is pressure sealed within the guide 27 by a resilient gasket 29 which has a plug opening 30 for being snap fitted about a groove 31 formed circumferentially about the plug 28. The plug 28 is also provided with a V-shaped indentation 32 for receiving the impact of the armature 13 at a bead 33.

The armature head 12 is provided to be outwardly extending with respect to the armature body 13 for providing a spring seat 34. A second spring seat is provided at the interior of a collar 35 abutting the solenoid winding 24. Finally, a biasing spring 36 is shown compressed between the first and second seats 34 and 35.

As has been noted above, the diaphragm 3 operates both as a gasket between the flanges 4 and 5 and as a valve head for sealing the outlet 9 at the valve seat 23. The diaphragm 3, however, performs even an additional function. It may be noted that the diaphragm 3 is disposed to be substantially taut in its connection between the flanges 4 and 5. It may also be noted that the upper housing 2 is provided in the form of a flat plate extending from the inlet 8 to the solenoid casing. In fact, the solenoid casing is substantially axially orientated with respect to the outlet 9. It can be appreciated, therefore, that as the armature 13 is withdrawn within the armature guide 27 the diaphragm 3 will be stretched within the solenoid casing for retarding further inward movement. It has been found that this retention of the armature by the resilient diaphragm 3 tends to lessen the noise potential by damping the oscillations that would otherwise be expected from the nature of the coil spring.

Figure 1:
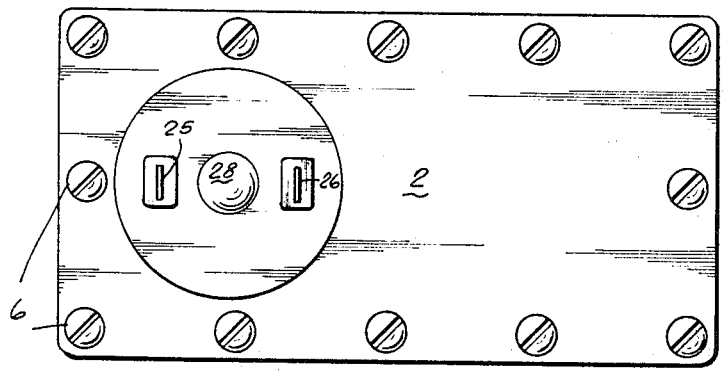
FIGURE 1 is a top view of the solenoid actuated valve assembly according to this invention having a single outlet.

In FIGURES 3 and 4 there is illustrated an extension of the concept set forth in the above FIGURES 1 and 2. Referring to FIGURE 4 it can be seen that this valve assembly also comprises an upper and a lower housing 37 and 38 which are pressure sealed through the use of a resilient diaphragm 39 functioning as a gasket between lower and upper flanges 40 and 41. In this embodiment the respective housings are pressure secured by rolling the flange 41 about the flange 40 as at 42 for compressing the diaphragm therebetween.

The lower housing 37 is provided with an inlet fitting 43 structurally similar to the inlet 8 and is press fitted within an opening 44. Likewise, an outlet fitting 45 is provided to be structurally similar to the outlet 9 and is press fitted within an opening 46 formed within the housing 37. In addition, a second outlet fitting 47 identical with the outlet 45 is press fitted within a third opening 48 formed within the lower housing 37.

Like the embodiment shown in FIGURE 2, the diaphragm of this example performs several important functions. First, as mentioned, the diaphragm 39 is engaged within the housing frame at the flanges 40 and 41 to seal the interior of the valve assembly. Also, like the example of FIGURE 2, the diaphragm 39 is used to close the outlet 45. This is accomplished by mounting the diaphragm at the lower extremity 49 of the armature 50. The mounting here is similar to that described above in that the diaphragm is provided with an armature opening 51 which is snap fitted about a circumferential groove 52 disposed about the lower extremity 49. Also, as in FIGURE 2, the diaphragm 39 is used here as a means of damping the potential oscillations associated with the armature 50. In this connection the upper valve housing 38 is provided with a depending diaphragm support 53 which provides a restraint on the free upward movement of the diaphragm to additionally retard the oscillations which otherwise would be expected from the spring biased armature.

However, in addition to the functions of the diaphragm 39 described above and illustrated in FIGURE 2, the diaphragm in this embodiment performs still another operation. It can be seen here that the diaphragm 39 is also used to open and close the second outlet 47 and to do so independently of the position or movement of the armature 50. This independent valve operation with a single diaphragm member is made possible through the provision for an elongated valve body formed between the lower and upper housings 37 and 38 respectively. It should be remembered that the resilient diaphragm 39 must be maintained substantially taut to provide the damping feature anticipated by the depending diaphragm support 53. This stretched feature of the diaphragm 39 would tend to destroy independent valve action if the individual outlets 45 and 47 were not substantially separated as in this example. In this example, however, it can be seen that the lifting of the second armature 54 leaves the resilient diaphragm substantially unaffected in the region of the first armature 50.

Also, in FIGURE 4, a means is provided for relieving the diaphragm pressure which is a direct consequence of locating the inlet and the outlet on the same side thereof. It may be noted in FIGURE 2 that with the outlet 9 in a closed position, and the inlet 8 communicable with the chamber 19, the lower side of the diaphragm 3 experiences an upward pressure in the vicinity between the collar 23 and the vertical solenoid casing. In the embodiment of FIGURE 4, this vertical pressure is eliminated by providing an equalizer port 55 axially of the inlet 43. In this way, when the respective outlets are held in a closed position the pressure from the inlet will be delivered to both sides of the diaphragm resulting in a zero net force distributed thereon. The importat result here is found in increased longevity of the diaphragm member and hence of the system itself.

The remaining elements associated with the valve assembly shown in FIGURE 4 are functionally equivalent to those illustrated in the detailed description of the solenoid valve of FIGURE 2. However, it merits noting that the coil 24 of FIGURE 4 is disposed externally of the upper housing 38, while in FIGURE 2 the coil 24 is disposed internally to the upper housing 2. The relevance of this internal versus external structure is in the need for a gasket intermediate the upper housing wall and the armature plug 28. In FIGURE 2, this gasket is required to prevent gas leakage which could occur between the outer face of the coil 24 and the inner face of the housing 2, while in FIGURE 4 this problem is eliminated by mounting the coil 24 externally of the upper housing 38. In FIGURE 4 an armature sleeve 56 provides the support for the coil assembly at an outwardly extending flange 57 which may be braised or welded to the upper surface 58 of the housing 38. Likewise, the plug 28 may be braised or welded within the sleeve 56 for providing a pressure seal thereby. Also, in FIGURE 4 a C-frame 59 is provided in place of the upper housing 2 to provide a flux path for the coil 24. The C-frame 59 is then secured about the coil 24 through a suitable cap fixture 60.

It will be understood that various modifications may be suggested by the embodiment disclosed but I desire to claim within the scope of the patent warranted hereon all such modifications as come within the scope of my invention.

I claim as my invention:
1. A valve assembly comprising:
a valve body having an inlet port leading thereinto and an outlet port extending therefrom,
a valve seat formed around said outlet port,
a resilient diaphragm,
said valve body having means holding said diaphragm substantially taut therein and extended across said outlet port,
a solenoid actuated armature operably disposed within said valve body and being substantially axially orientated relative to said outlet,
said solenoid actuated armature having a face thereof secured to said resilient diaphragm at said outlet,
said face having an outside diameter which is substantially smaller than the inside diameter of said outlet port,
means biasing said solenoid actuated armature in a direction for holding said resilient diaphragm contiguous with said valve seat,
actuation means for moving said armature against said biasing means for opening said outlet.
2. A valve assembly in accordance with claim 1 wherein said valve seat comprises a relatively narrow ridge formed around said outlet port at the interior of said valve body and contacting said diaphragm at a relatively fine line outwardly of the periphery of said face of said armature.

References Cited

UNITED STATES PATENTS

| | | | |
|---|---|---|---|
| 2,169,043 | 8/1939 | Goehring | 137—608 X |
| 2,353,848 | 7/1944 | Ray | 251—141 |
| 2,435,076 | 1/1948 | Hall | 251—140 X |
| 2,781,780 | 2/1957 | Zahradka | 137—608 |
| 2,863,628 | 12/1958 | Rinsha et al. | 251—141 X |
| 2,868,312 | 1/1959 | Erwin | 137—608 X |
| 2,940,474 | 6/1960 | Webster | 137—612.1 |
| 3,019,815 | 2/1962 | Lenardon et al. | 137—612.1 |
| 3,083,943 | 4/1963 | Stewart et al. | 251—331 X |
| 3,140,727 | 7/1964 | Cutler | 251—141 X |

SAMUEL SCOTT, *Primary Examiner.*